(12) United States Patent
Sawai et al.

(10) Patent No.: US 8,740,169 B2
(45) Date of Patent: Jun. 3, 2014

(54) DISPLAY SCREEN TURNING APPARATUS

(75) Inventors: Kunio Sawai, Daito (JP); Katsuhiko Makino, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 588 days.

(21) Appl. No.: 12/553,407

(22) Filed: Sep. 3, 2009

(65) Prior Publication Data

US 2010/0091214 A1  Apr. 15, 2010

(30) Foreign Application Priority Data

Oct. 10, 2008  (JP) .................................. 2008-263563

(51) Int. Cl.
*A47B 91/00*  (2006.01)

(52) U.S. Cl.
USPC .................. 248/349.1; 248/919; 248/346.01; 361/679.07

(58) Field of Classification Search
USPC .................. 248/349.1, 917, 146, 919, 299.1, 248/346.01, 292.14; 348/827; 349/58; 361/679.22
See application file for complete search history.

(56) References Cited

U.S. PATENT DOCUMENTS

| | | | |
|---|---|---|---|
| 6,231,020 B1 * | 5/2001 | Willson ..................... | 248/349.1 |
| 6,334,599 B1 | 1/2002 | Jeong | |
| 6,354,550 B2 | 3/2002 | Jeong | |
| 6,801,426 B2 * | 10/2004 | Ichimura .................. | 361/679.06 |
| 7,114,218 B1 * | 10/2006 | Lin ................................ | 16/342 |
| 7,152,836 B2 * | 12/2006 | Pfister et al. ............. | 248/292.14 |
| 7,287,729 B2 * | 10/2007 | Jung et al. .................. | 248/122.1 |
| 7,384,021 B2 * | 6/2008 | Liao ............................... | 248/415 |
| 7,516,925 B2 * | 4/2009 | Sawai et al. ................... | 248/146 |
| 7,708,239 B2 * | 5/2010 | Watanabe et al. .......... | 248/125.7 |
| 7,770,862 B2 * | 8/2010 | Chen ............................. | 248/351 |
| 7,817,410 B2 * | 10/2010 | Sawai ...................... | 361/679.22 |
| 7,874,537 B2 * | 1/2011 | Kameoka et al. .......... | 248/349.1 |
| 7,950,610 B2 * | 5/2011 | Sawai ............................ | 248/131 |
| 7,984,889 B2 * | 7/2011 | Whitley et al. ............... | 248/371 |
| 8,002,223 B2 * | 8/2011 | Sawai et al. ................... | 248/146 |
| 2007/0047188 A1 * | 3/2007 | Kim ............................. | 361/681 |
| 2007/0181762 A1 * | 8/2007 | Dittmer ..................... | 248/274.1 |
| 2007/0246629 A1 * | 10/2007 | Saxton et al. ............. | 248/309.1 |
| 2008/0035821 A1 * | 2/2008 | Kameoka et al. .......... | 248/349.1 |
| 2008/0049390 A1 * | 2/2008 | Sawai et al. ................... | 361/681 |

FOREIGN PATENT DOCUMENTS

| | | |
|---|---|---|
| JP | 7-240890 A | 9/1995 |
| JP | 10-131944 A | 5/1998 |
| JP | 2000-184314 A | 6/2000 |
| JP | 2005-284087 A | 10/2005 |
| JP | 2008-51830 A | 3/2008 |

OTHER PUBLICATIONS

Extended European Search Report dated Feb. 7, 2012 (six (6) pages).

* cited by examiner

*Primary Examiner* — Terrell McKinnon
*Assistant Examiner* — Daniel J Breslin
(74) *Attorney, Agent, or Firm* — Crowell & Moring LLP

(57) ABSTRACT

This display screen turning apparatus includes a first rotation support portion formed to be horizontally rotatable with respect to a base and a second rotation support portion formed to be horizontally rotatable with respect to the base independently of the first rotation support portion, for horizontally rotating a display screen portion by rotating at least either the first rotation support portion or the second rotation support portion.

16 Claims, 12 Drawing Sheets

DISPLAY SCREEN TURNING APPARATUS

BACKGROUND OF THE INVENTION

1. Field of the Invention

The present invention relates to a display screen turning apparatus, and more particularly, it relates to a display screen turning apparatus having a display screen portion formed to be horizontally rotatable.

2. Description of the Background Art

A display screen turning apparatus having a display screen portion formed to be horizontally rotatable is known in general. Such a display screen turning apparatus is disclosed in each of Japanese Patent Laying-Open Nos. 2008-51830, 2005-284087, 10-131944 (1998), 7-240890 (1995) and 2000-184314, for example.

The aforementioned Japanese Patent Laying-Open No. 2008-51830 discloses a display screen turning apparatus including a base having an upright portion (shaft) formed to extend in the vertical direction and a rotational member supporting a display screen portion. The rotational member is formed to horizontally rotate with respect to the base around the upright portion serving as the center of rotation. Thus, the display screen portion is horizontally rotatable around the upright portion serving as the center of rotation.

The aforementioned Japanese Patent Laying-Open No. 2005-284087 discloses a turning apparatus for a thin display screen (display screen turning apparatus) including a base member (base), a bracket member (rotational member) mounted with the thin display screen and a main shaft extending in the vertical direction to pass through the base member and the bracket member. The bracket member is formed to horizontally rotate with respect to the base member around the main shaft serving as the center of rotation. Thus, the thin display screen is horizontally rotatable around the main shaft serving as the center of rotation.

The aforementioned Japanese Patent Laying-Open No. 10-131944 discloses a rotation support mechanism (display screen turning apparatus) including a rotational base (rotational member) receiving a display and a fixed base (base) having a rotation support protrusion formed to extend in the vertical direction. The rotational base is formed to horizontally rotate with respect to the fixed base around the rotation support protrusion serving as the center of rotation. Thus, the display is horizontally rotatable around the rotation support protrusion serving as the center of rotation.

The aforementioned Japanese Patent Laying-Open No. 7-240890 discloses a cabinet rotating apparatus (display screen turning apparatus) including a cabinet (rotational member) storing a display screen and a base supporting the cabinet. The cabinet has a plurality of arcuate ribs forming an arc centering on a prescribed axis on the bottom surface thereof, and the base has arcuate grooves engaging with the plurality of arcuate ribs of the cabinet respectively. The arcuate ribs are so guided into the arcuate grooves that the cabinet horizontally rotates with respect to the base around the central axis, serving as the center of rotation, of the arc. Thus, the display screen is horizontally rotatable around the central axis, serving as the center of rotation, of the arc formed by the arcuate ribs.

The aforementioned Japanese Patent Laying-Open No. 2000-184314 discloses a rotating apparatus (display screen turning apparatus) including a receiver body having a display screen and a rotation stand (base) receiving the receiver body. The receiver body has a pair of downwardly protruding rotating shafts on the bottom surface thereof, while the rotation stand has a pair of arcuate movement guide grooves formed to receive the pair of rotating shafts of the receiver body in a slidable manner respectively when the receiver body is placed on the upper surface thereof. The receiver body is so formed that, when the first rotating shaft is positioned on an end of the first movement guide groove, the second rotating shaft horizontally rotates with respect to the rotation stand along the second arcuate movement guide groove around the first rotating shaft. Thus, the display screen is horizontally rotatable around the first rotating shaft serving as the center of rotation. In this rotating apparatus, the display screen is also horizontally rotatable around the second rotating shaft serving as the center of rotation, similarly to the above. In the rotating apparatus according to the aforementioned Japanese Patent Laying-Open No. 2000-184314, the receiver body is directly placed on the rotation stand, and no support portion is provided for supporting the receiver body.

However, while the display screen portion is horizontally rotatable around the upright portion, the main shaft, the rotation support protrusion or the central axis of the arc formed by the arcuate ribs serving as the center of rotation in each of the display screen turning apparatuses described in the aforementioned Japanese Patent Laying-Open Nos. 2008-51830, 2005-284087, 10-131944 and 7-240890, the display screen portion rotated around the upright portion, the main shaft, the rotation support protrusion or the central axis of the arc formed by the arcuate ribs can be rotated only along a single rotational track, and the degree of freedom in arrangement of the display screen portion is disadvantageously reduced.

In the rotating apparatus described in the aforementioned Japanese Patent Laying-Open No. 2000-184314, the display screen can be rotated around both of the rotating shafts serving as the centers of rotation, and hence the degree of freedom in arrangement of the display screen is improved as compared with the display screen turning apparatuses described in the aforementioned Japanese Patent Laying-Open Nos. 2008-51830, 2005-284087, 10-131944 and 7-240890. According to Japanese Patent Laying-Open No. 2000-184314, however, the rotating apparatus is provided with no support portion supporting the receiver body, and hence the receiver body must be self-supported on the rotation stand. When the receiver body is formed by a thin display or the like having a long and narrow bottom surface, therefore, the receiver body cannot be stably placed on the rotation stand.

SUMMARY OF THE INVENTION

The present invention has been proposed in order to solve the aforementioned problems, and an object of the present invention is to provide a display screen turning apparatus having a high degree of freedom in arrangement of a display screen portion and capable of stably supporting the display screen portion regardless of the shape thereof.

A display screen turning apparatus according to an aspect of the present invention includes a base, a first rotation support portion provided separately from the base for supporting a display screen portion and formed to be horizontally rotatable with respect to the base and a second rotation support portion provided separately from the base for supporting the display screen portion and formed to be horizontally rotatable with respect to the base independently of the first rotation support portion, for horizontally rotating the display screen portion by rotating at least either the first rotation support portion or the second rotation support portion.

As hereinabove described, the display screen turning apparatus according to this aspect of the present invention is provided with the first rotation support portion formed to be horizontally rotatable with respect to the base and the second rotation support portion formed to be horizontally rotatable with respect to the base independently of the first rotation support portion for horizontally rotating the display screen portion by rotating at least either the first rotation support portion or the second rotation support portion so that the display screen portion is rotated along different rotational tracks when only the first rotation support portion is rotated, only the second rotation support portion is rotated and both of the first and second rotation support portions are rotated respectively, whereby the degree of freedom in arrangement (direction and position) of the display screen portion can be increased. Further, the display screen portion is so supported by the first and second rotation support portions that the same may not be self-supported on the base. Therefore, the display screen portion can be stably supported by the first and second rotation support portions also when the same is thinly formed.

In the display screen turning apparatus according to the aforementioned aspect, at least either the first rotation support portion or the second rotation support portion preferably includes a slide member formed to horizontally slide with respect to the base and a support member, supporting the display screen portion, formed to be horizontally rotatable with respect to the slide member. According to this structure, the display screen portion can be smoothly horizontally rotated by horizontally rotating the support member provided on either the first rotation support portion or the second rotation support portion with respect to the slide member when either the second rotation support portion or the first rotation support portion slides with respect to the base.

In this case, the slide member preferably includes a first slide member, constituting the first rotation support portion, formed to horizontally slide with respect to the base and a second slide member, constituting the second rotation support portion, formed to horizontally slide with respect to the base, and the support member preferably includes a first support member, constituting the first rotation support portion along with the first slide member, formed to be horizontally rotatable with respect to the first slide member and a second support member, constituting the second rotation support portion along with the second slide member, formed to be horizontally rotatable with respect to the second slide member. According to this structure, the second support member (first support member) can be horizontally rotated with respect to the second slide member (first slide member) when the first slide member (second slide member) slides with respect to the base, whereby the display screen portion can be more smoothly horizontally rotated.

In the aforementioned structure including the first support member and the second support member, the first support member is preferably formed to support a first horizontal side of the display screen portion as viewed from the front side and to horizontally rotate with respect to the first slide member following movement of the second slide member, and the second support member is preferably formed to support a second horizontal side of the display screen portion as viewed from the front side and to horizontally rotate with respect to the second slide member following movement of the first slide member. According to this structure, the second support member (first support member) supporting the second horizontal side (first horizontal side) is also rotated when the first slide member (second slide member) of the first horizontal side (second horizontal side) is rotated, whereby the display screen portion can be more smoothly rotated.

In the aforementioned structure including the first slide member and the second slide member, the base preferably includes a guide portion guiding rotation of the first slide member and the second slide member when the first slide member and the second slide member horizontally rotate respectively. According to this structure, the display screen portion can be more smoothly rotated by rotating the first slide member and the second slide member along the guide portion.

In the aforementioned structure having the base including the guide portion, the first slide member preferably has a first rotation control portion controlling rotation of the first slide member by coming into contact with the guide portion when the first slide member rotates with respect to the base portion, and the second slide member preferably has a second rotation control portion controlling rotation of the second slide member by coming into contact with the guide portion when the second slide member rotates with respect to the base. According to this structure, the display screen portion can be easily prevented from rotation in excess of a prescribed angle with the first and second rotation control portions.

In the aforementioned structure including the first rotation control member and the second rotation control member, the first rotation control portion and the second rotation control portion are preferably integrally provided on both ends of side portions of the first slide member and the second slide member guided by the guide portion respectively. According to this structure, the display screen portion can be easily prevented from rotation in excess of the prescribed angle regardless of the rotational direction of the first slide member (second slide member), while increase in the number of components is suppressed due to the first rotation control portion (second rotation control portion) integrally provided on each end of the corresponding side portion.

In the aforementioned structure having the base including the guide portion, the guide portion of the base is preferably formed to inhibit the first slide member and the second slide member from floating up from the base respectively. According to this structure, the first and second slide members can be inhibited from floating up from the base when the display screen portion is horizontally rotated.

In the aforementioned structure having the first rotation control member and the second rotation control member integrally provided on the first slide member and the second slide member respectively, the guided side portions of the first slide member and the second slide member are preferably arcuately formed respectively. According to this structure, the display screen portion can be more smoothly rotated by rotating the first slide member (second slide member) so that the corresponding arcuate side portion is along the guide portion.

In the aforementioned structure having the arcuately formed guided side portions, the first rotation control portion is preferably formed to protrude in the radial direction of the arc formed by the side portion of the first slide member, and the second rotation control portion is preferably formed to protrude in the radial direction of the arc formed by the side portion of the second slide member. According to this structure, the display screen portion can be easily prevented from rotation in excess of the prescribed angle due to the first rotation control portion (second rotation control portion) having the simple shape protruding in the radial direction of the arc formed by the side portion of the first slide member (second slide member).

In the aforementioned structure having the base including the guide portion, the guide portion is preferably integrally formed on the base. According to this structure, increase in the number of components can be suppressed.

In the aforementioned structure including the first slide member and the second slide member, the first slide member and the second slide member preferably have projecting portions on surfaces coming into contact with the base respectively, and are formed to horizontally rotate when the projecting portions slide with respect to the base. According to this structure, the first slide member and the second slide member rotate while only the projecting portions are in contact with the base, whereby the range of abrasions caused on the members due to friction in rotation can be restricted.

In the aforementioned structure including the projecting portions, each of the first slide member and the second slide member preferably has a plurality of projecting portions, and the plurality of projecting portions preferably have substantially identical heights respectively. According to this structure, the first slide member (second slide member) can be horizontally placed on the upper surface of the base while separating portions of the first slide member (second slide member) other than the projecting portions from the base, also when the projecting portions are provided for restricting the range of abrasions.

In the aforementioned structure including the first slide member and the second slide member, the base preferably includes a disengagement preventing portion preventing disengagement of the first slide member and the second slide member. According to this structure, the first slide member and the second slide member can be prevented from disengaging from the base respectively, whereby the display screen portion can be more stably supported by the first rotation support portion and the second rotation support portion.

In the aforementioned structure including the disengagement preventing portion, the disengagement preventing portion is preferably provided on the base to vertically protrude upward from the upper surface of the base and formed to prevent disengagement of the first slide member by coming into contact with the first slide member when the first slide member rotates and to prevent disengagement of the second slide member by coming into contact with the second slide member when the second slide member rotates. According to this structure, the first slide member and the second slide member can be easily prevented from disengaging from the base respectively by the disengagement preventing portion having the simple structure vertically protruding upward from the upper surface of the base.

In the aforementioned structure having the disengagement preventing portion vertically protruding upward from the upper surface of the base, the disengagement preventing portion is preferably arranged on opposed sides of the first slide member and the second slide member. According to this structure, the first slide member (second slide member) comes into contact with the disengagement preventing portion when the same deviates toward the second slide member (first slide member), whereby the first slide member (second slide member) can be prevented from disengaging from the base toward the second slide member (first slide member).

In the aforementioned structure having the disengagement preventing portion vertically protruding upward from the upper surface of the base, the disengagement preventing portion preferably has a circular shape in plan view. According to this structure, the disengagement preventing portion can be smoothly brought into contact with the first slide member (second slide member) dissimilarly to a case of working the disengagement preventing portion into a rectangular shape or the like having corner portions.

In the aforementioned structure including the disengagement preventing portion, the disengagement preventing portion is preferably integrally provided on the base. According to this structure, increase in the number of components can be suppressed.

In the aforementioned structure including the first slide member and the second slide member, the first slide member and the second slide member preferably have side portions vertically folded upward respectively. According to this structure, rigidity of the first slide member (second slide member) can be improved due to the folded side portion.

In the aforementioned structure including the first support member and the second support member, the first support member and the second support member are preferably formed to support the display screen portion to be anteroposteriorly rotatable respectively. According to this structure, the display screen portion can be rotated also in the anteroposterior direction in addition to the horizontal direction, whereby the degree of freedom in arrangement of the display screen portion can be further improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

First Embodiment

The structure of a display screen turning apparatus 1 according to a first embodiment of the present invention is described with reference to FIGS. 1 to 6.

Figure 1:
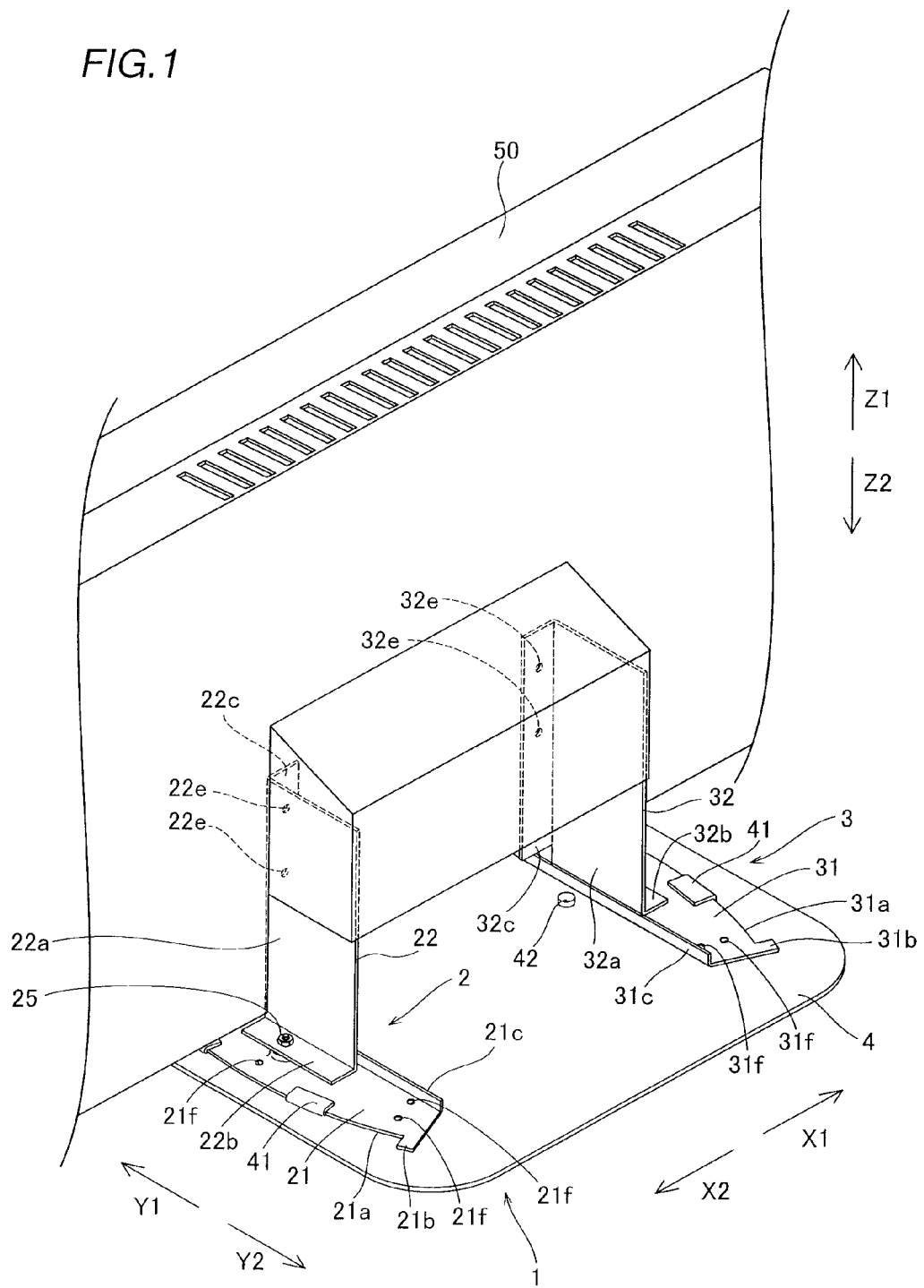
FIG. 1 is a perspective view showing the overall structure of a liquid crystal display provided with a display screen turning apparatus according to a first embodiment of the present invention.
Figure 2:
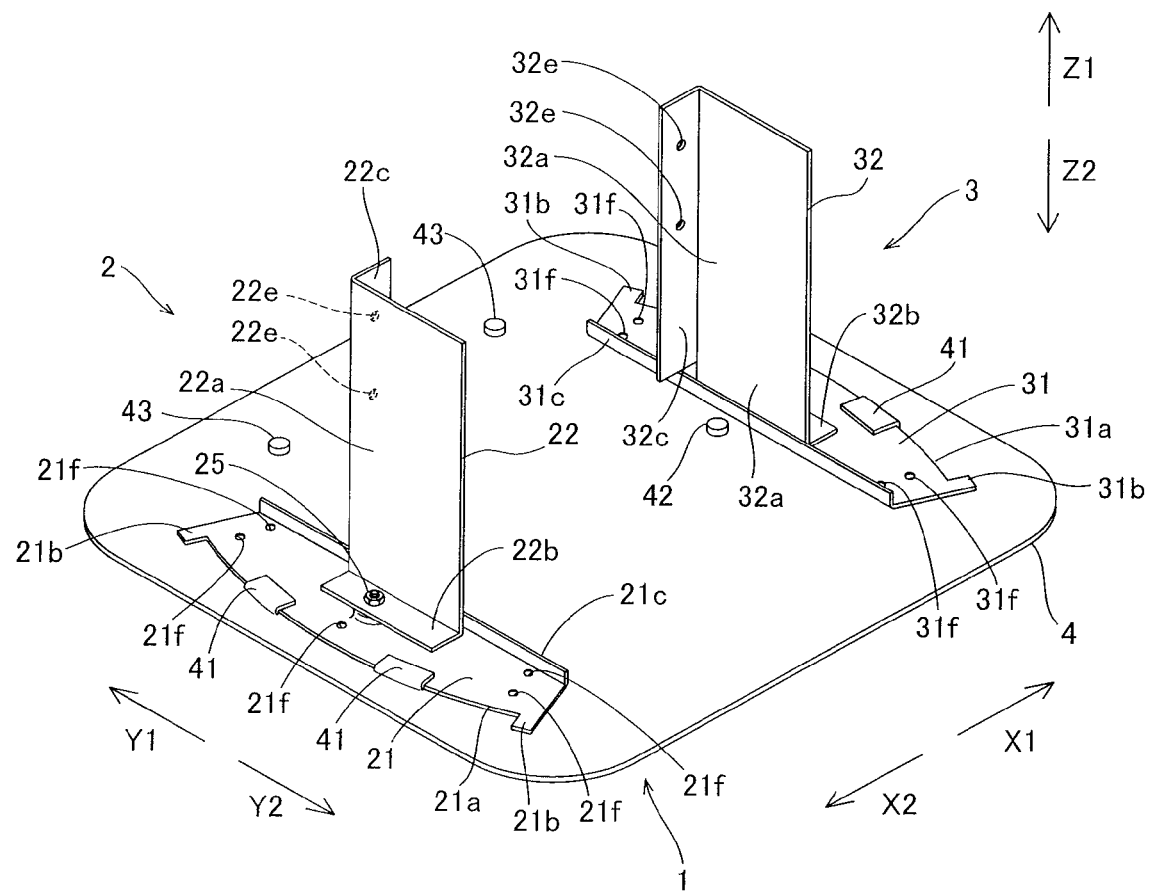
FIG. 2 is a perspective view showing the overall structure of the display screen turning apparatus according to the first embodiment of the present invention shown in FIG. 1.
Figure 3:
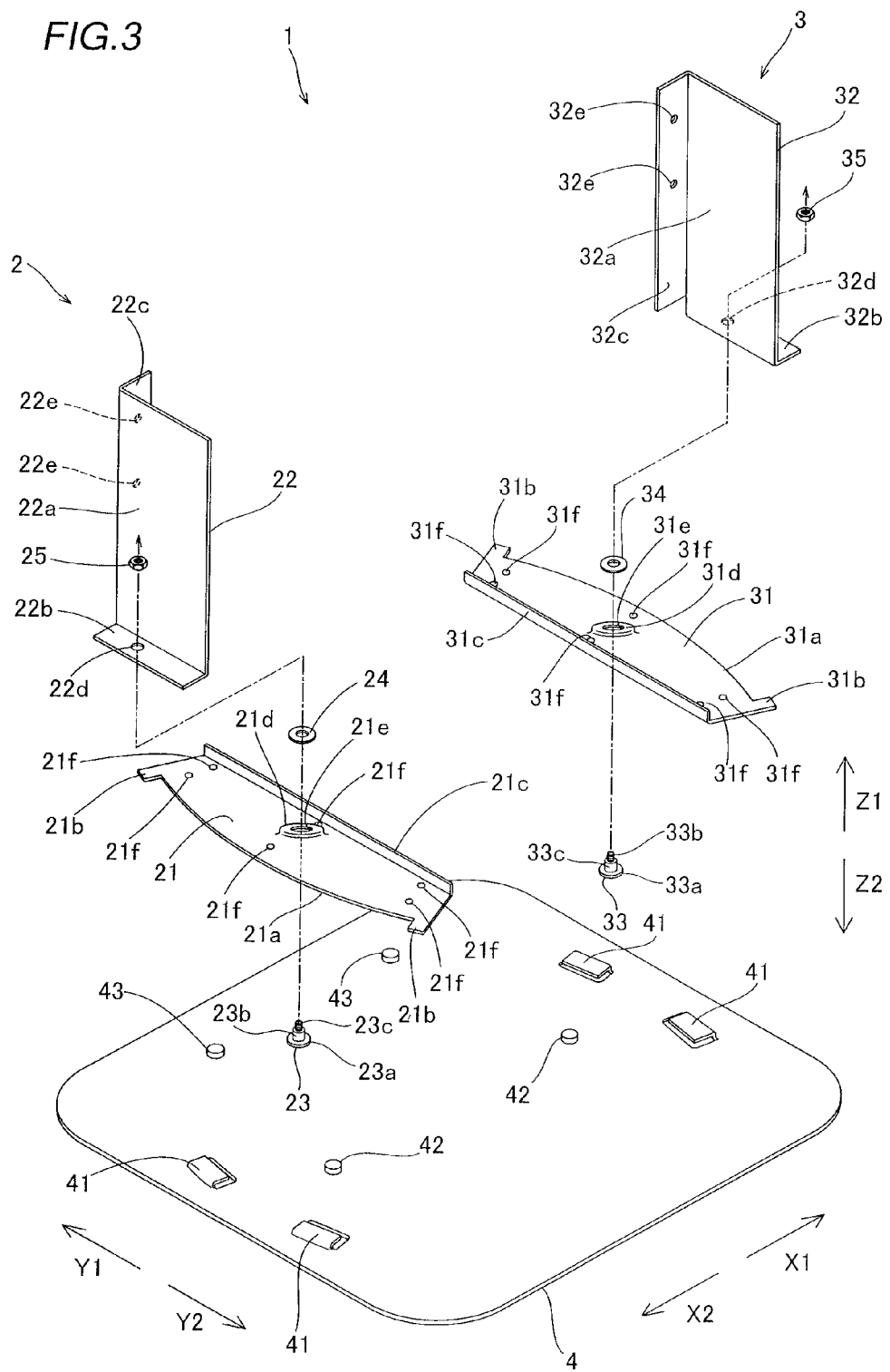
FIG. 3 is an exploded perspective view showing the overall structure of the display screen turning apparatus according to the first embodiment of the present invention shown in FIG. 1.

The display screen turning apparatus 1 according to the first embodiment of the present invention includes a right rotation support portion 2, a left rotation support portion 3 and a base 4 of sheet metal, as shown in FIGS. 1 to 3. The right rotation support portion 2 is an example of the "first rotation support portion" in the present invention, and the left rotation support portion 3 is an example of the "second rotation support portion" in the present invention.

The right rotation support portion 2 is formed to support the right side (along arrow X2) of a display screen portion 50 as viewed from the front side and to rotate in the horizontal direction (along arrows A1 and A2) with respect to the base 4 independently of the left rotation support portion 3. More specifically, the right rotation support portion 2 includes a slide member 21 of sheet metal in the form of a horizontal plane and a support member 22 of sheet metal. The slide member 21 is formed to horizontally rotate with respect to the base 4, while the support member 22 is formed to support the right side (along arrow X2) of the display screen portion 50 as viewed from the front side. The slide member 21 is an example of the "first slide member" in the present invention, and the support member 22 is an example of the "first support member" in the present invention.

Figure 4:
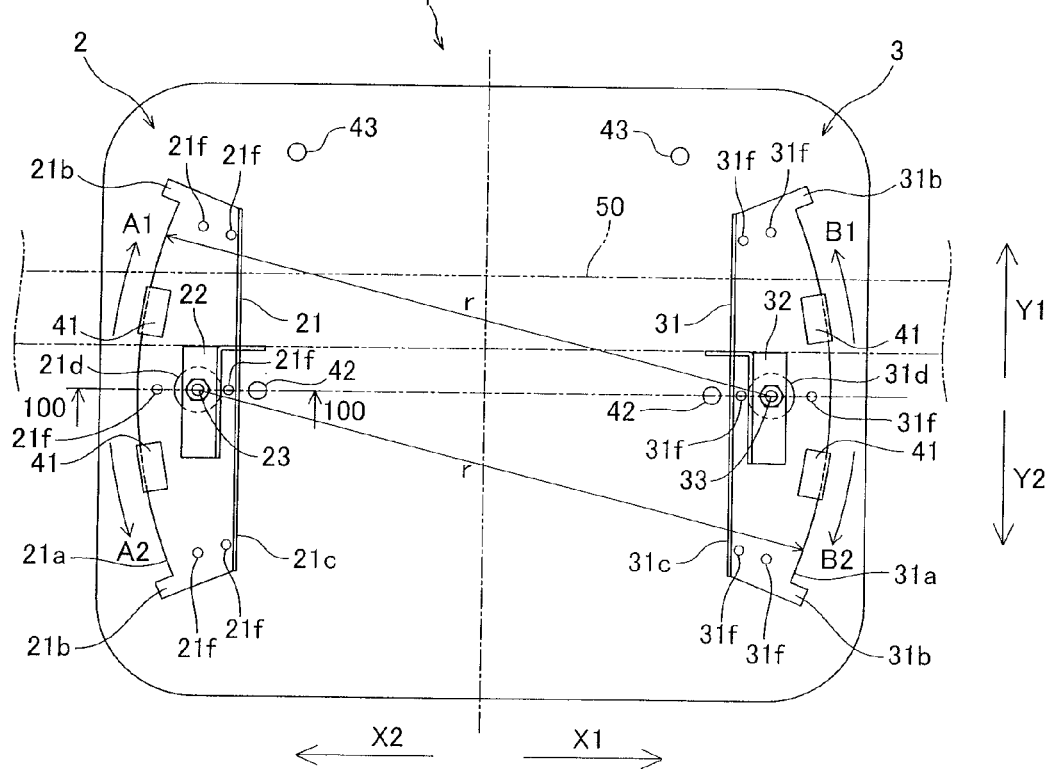
FIG. 4 is a plan view showing the overall structure of the display screen turning apparatus according to the first embodiment of the present invention shown in FIG. 1.

According to the first embodiment, the slide member 21 is arranged on a side of the base 4 along arrow X2 in plan view, as shown in FIG. 4. In the slide member 21, an outer side portion 21*a* (along arrow X2) is in the form of an arc, having a radius r, centering on a shaft portion 33 (described later) of the left rotation support portion 3 in the state (shown in FIG. 4) where the display screen portion 50 is not rotated. Protrusions 21*b* protruding in the radial direction of the arc formed by the side portion 21*a* are integrally formed on both ends of the arcuate side portion 21*a* respectively. The protrusions 21*b* have functions of controlling rotation of the slide member 21 by coming into contact with guide portions 41 (described later) of the base 4 when the slide member 21 rotates with respect to the base 4. The protrusions 21*b* are examples of the "first rotation control portion" in the present invention.

An inner side portion 21*c* (along arrow X1) of the slide member 21 is in the form of a straight line extending in the anteroposterior direction (along arrows Y1 and Y2) in the state (shown in FIG. 4) where the display screen portion 50 is not rotated. The linear side portion 21*c* is vertically folded upward (along arrow Z1), as shown in FIGS. 1 to 3, 5 and 6. Thus, rigidity (mechanical strength) of the slide member 21 is improved.

Figure 5:
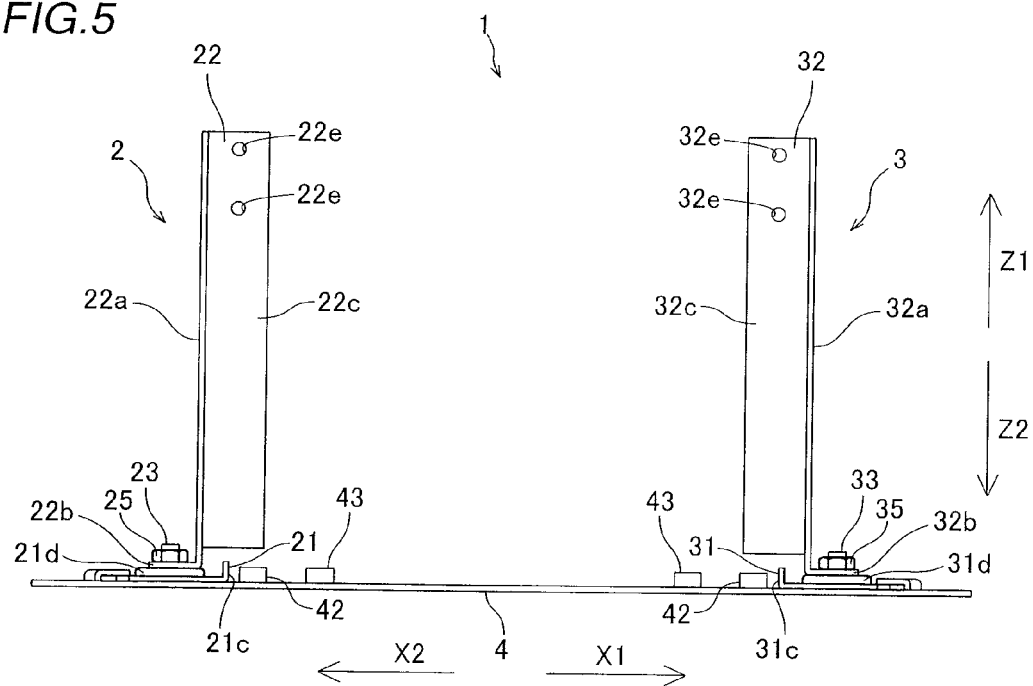
FIG. 5 is a rear elevational view showing the overall structure of the display screen turning apparatus according to the first embodiment of the present invention shown in FIG. 1.
Figure 6:
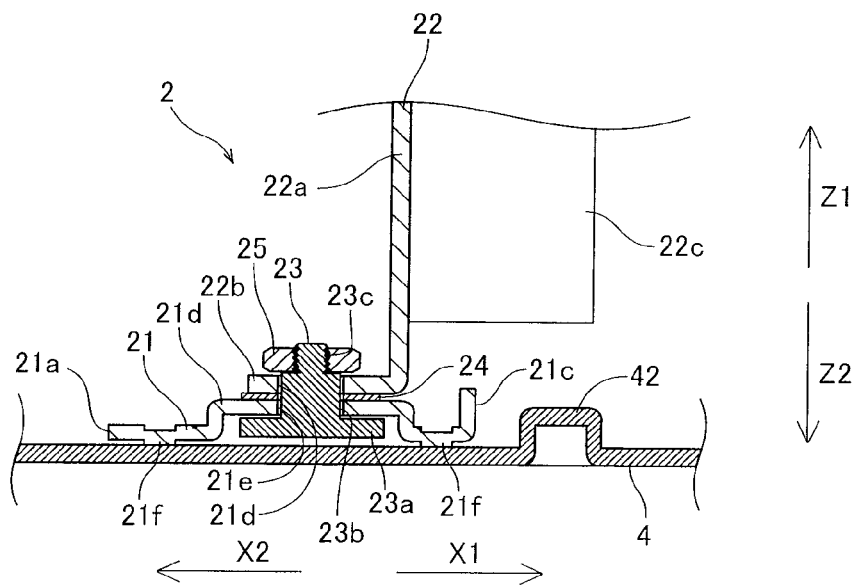
FIG. 6 is a sectional view taken along the line 100-100 in FIG. 4.

A substantially central portion of the slide member 21 is drawn to protrude upward as shown in FIGS. 3 to 6, and a crest portion 21*d* circular in plan view is integrally formed on the slide member 21. The upper surface of the crest portion 21*d* is substantially in the form of a horizontal plane. A circular through-hole 21*e* capable of receiving a shaft portion 23 is formed in a substantially central portion of the crest portion 21*d* in plan view, as shown in FIGS. 3 and 6. A head portion 23*a* of the shaft portion 23 is arranged under the lower surface of the crest portion 21*d* concaved by the drawing as shown in FIG. 6, and a body portion 23*b* of the shaft portion 23 is inserted into the through-hole 21*e*.

The slide member 21 has downwardly protruding projecting portions 21*f* on a surface (along arrow Z2) coming into contact with the base 4, as shown in FIG. 6. Three pairs of such projecting portions 21*f* are formed in the vicinity of the central portion, the front end (along arrow Y1) and the rear end (along arrow Y2) of the slide member 21 in plan view respectively, as shown in FIGS. 3 and 4. The projecting portions 21*f* are circular in plan view, and surfaces thereof coming into contact with the base 4 are in the form of horizontal planes. The six projecting portions 21*f* are formed to protrude from the lower surface (along arrow Z2) of the slide member 21 in the same height respectively. Thus, the slide member 21 can be placed on the base 4 in a horizontal state while separating portions of the lower surface of the slide member 21 other than the projecting portions 21*f* from the base 4. The slide member 21 is formed to horizontally rotate when the six projecting portions 21*f* slide with respect to the base 4.

The support member 22 has a platelike upright portion 22*a* formed to extend in the vertical direction (along arrows Z1 and Z2) as shown in FIGS. 1 to 3, and the platelike upright portion 22*a* is so arranged that the thickness direction thereof is along the anteroposterior direction (along arrows Y1 and Y2) in the state (shown in FIG. 4) where the display screen portion 50 is not rotated. A platelike set portion 22*b* folded along arrow X2 is integrally formed on the lower end of the upright portion 22*a*. The platelike set portion 22*b* is in the form of a horizontal plane, as shown in FIGS. 5 and 6. The set portion 22*b* has a circular through-hole 22*d* formed to receive the body portion 23*b* of the shaft portion 23, as shown in FIGS. 3 and 6. The support member 22 is arranged on the slide member 21 through a washer 24 and mounted on the slide member 21 by fitting a nut 25 with a screw portion 23*c* of the shaft portion 23, as shown in FIG. 6. Thus, the support member 22 is horizontally rotatable with respect to the slide member 21. The support member 22 is formed to horizontally rotate with respect to the slide member 21 following rotation of a slide member 31 (described later) of the left rotation support portion 3.

As shown in FIGS. 1 to 3, a platelike mounting portion 22*c* folded along arrow X1 is integrally formed on the front side (along arrow Y1) of the upright portion 22*a* of the support member 22. The platelike mounting portion 22*c* is so arranged that the thickness direction thereof is along the anteroposterior direction (along arrows Y1 and Y2) in the state (shown in FIG. 4) where the display screen portion 50 is not rotated. The lower end of the mounting portion 22*c* is arranged on a position higher than the folded side portion 21*c* of the slide member 21, as shown in FIGS. 5 and 6. Thus, the mounting portion 22*c* is not brought into contact with the side portion 21*c* of the slide member 21, whereby the support member 22 is smoothly horizontally rotatable. Two threaded holes 22*e* are formed in the upper portion of the mounting portion 22*c* at a prescribed distance from each other in the vertical direction. The back surface of the right side (along arrow X2) of the display screen portion 50 as viewed from the front side is mounted on the support member 22 with screws (not shown) inserted into the threaded holes 22*e*, as shown in FIG. 1. Thus, the support member 22 is coupled to the left rotation support portion 3 through the display screen portion 50, as described later. When the left rotation support portion 3 is horizontally rotated with respect to the base 4, therefore, the support member 22 is horizontally rotated with respect to the slide member 21 following the rotation of the left rotation support portion 3.

The left rotation support portion 3 is formed to support the left side (along arrow X1) of the display screen portion 50 as viewed from the front side and to horizontally rotate (along arrows B1 and B2) with respect to the base 4 independently of the right rotation support portion 2. More specifically, the left rotation support portion 3 includes the slide member 31 of sheet metal and a support member 32 of sheet metal. The slide member 31 is formed to horizontally rotate with respect to the base 4, while the support member 32 is formed to support the left side (along arrow X1) of the display screen portion 50 as viewed from the front side. The slide member 31 is an example of the "second slide member" in the present invention, and the support member 32 is an example of the "second support member" in the present invention.

The slide member 31 and the support member 32 of the left rotation support portion 3 are similar in structure to the slide member 21 and the support member 22 of the right rotation support portion 2 respectively, and bilaterally symmetrical to the slide member 21 and the support member 22 of the right rotation support portion 2 respectively. Therefore, redundant description of the slide member 31 and the support member 32 of the left rotation support portion 3 is omitted. As shown in FIG. 3, an arcuate side portion 31a, protrusions 31b, a linear side portion 31c, a crest portion 31d, a through-hole 31e and projecting portions 31f of the slide member 31 of the left rotation support portion 3 correspond to the arcuate side portion 21a, the projecting portions 21b, the linear side portion 21c, the crest portion 21d, the through-hole 21e and the projecting portions 21f of the slide member 21 of the right rotation support portion 2 respectively. Further, an upright portion 32a, a set portion 32b, a mounting portion 32c, a through-hole 32d and threaded holes 32e of the support member 32 of the left rotation support portion 3 correspond to the upright portion 22a, the set portion 22b, the mounting portion 22c, the through-hole 22d and the threaded holes 22e of the support member 22 of the right rotation support portion 2 respectively, while the shaft portion 33, a head portion 33a, a body portion 33b, a screw portion 33c, a washer 34 and a nut 35 of the left rotation support portion 3 correspond to the shaft portion 23, the head portion 23a, the body portion 23b, the screw portion 23c, the washer 24 and the nut 25 of the right rotation support portion 2 respectively. The projecting portions 31b are examples of the "second rotation control portion" in the present invention.

As hereinabove described, the right rotation support portion 2 and the left rotation support portion 3 are horizontally rotatable with respect to the base portion 4 independently of each other, and the display screen turning apparatus 1 according to the first embodiment is formed to be capable of horizontally rotating the display screen portion 50 by rotating at least either the right rotation support portion 2 or the left rotation support portion 3. The display screen portion 50 can also be rotated by rotating both of the right rotation support portion 2 and the left rotation support portion 3.

The base 4 is in the form of a platelike horizontal plane, as shown in FIGS. 1 to 4. Further, the base 4 is substantially in the form of a rectangle having arcuate corner portions in plan view, and is arranged to be longitudinal in the horizontal direction (along arrows X1 and X2). The base 4 has the guide portions 41 integrally formed thereon by partially uprighting the base 4 to be along the arcuate side portions 21a and 31a of the slide members 21 and 31 in the state where the display screen portion 50 is not rotated, as shown in FIG. 4.

Two pairs of such guide portions 41 are provided on the slide members 21 and 31 respectively. When the slide members 21 and 31 rotate, the guide portions 41 guide the rotation of the slide members 21 and 31 along the side portions 21a and 31a thereof. Base portions of the guide portions 41 are raised up to a height slightly larger than the thickness of the slide members 21 and 31, while the remaining portions of the guide portions 41 are formed to horizontally extend inward from the outer side of the base 4. Further, the guide portions 41 are arranged to overlap with parts of the slide members 21 and 31 in plan view, to inhibit the slide members 21 and 31 from floating up from the base 4.

On substantially central portions in the anteroposterior direction (along arrows Y1 and Y2), the base 4 has two first disengagement preventing portions 42 integrally formed thereon by drawing to vertically protrude upward on positions inward beyond the side portions 21c and 31c of the slide members 21 and 31 respectively in the state where the display screen portion 50 is not rotated, as shown in FIG. 4. The base 4 further has two second disengagement preventing portions 43 arranged inward beyond the two first disengagement preventing portions 42 in front of the slide members 21 and 31 (along arrow Y1) in the state where the display screen portion 50 is not rotated. The second disengagement preventing portions 43 are integrally formed on the base 4 by drawing to vertically protrude upward, similarly to the first disengagement preventing portions 42. The first disengagement preventing portions 42 and the second disengagement preventing portions 43 are examples of the "disengagement preventing portion" in the present invention respectively.

The first disengagement preventing portion 42 and the second disengagement preventing portion 43 provided along arrow X2 are formed to prevent the slide member 21 from disengaging inward (along arrow X1) beyond the first disengagement preventing portion 42 and the second disengagement preventing portion 43 upon rotation of the slide member 21 respectively. On the other hand, the first disengagement preventing portion 42 and the second disengagement preventing portion 43 provided along arrow X1 are formed to prevent the slide member 31 from disengaging inward (along arrow X2) beyond the first disengagement preventing portion 42 and the second disengagement preventing portion 43 upon rotation of the slide member 31 respectively. In other words, the first disengagement preventing portions 42 and the second disengagement preventing portions 43 are arranged on opposed sides of the slide members 21 and 31 respectively. Thus, the slide members 21 and 31 are brought into contact with the first and second disengagement preventing portions 42 and 43 and prevented from disengaging from the base 4 upon rotation, whereby the display screen portion 50 can be stably supported by the right rotation support portion 2 and the left rotation support portion 3. The first disengagement preventing portions 42 and the second disengagement preventing portions 43 are circularly formed in plan view respectively, to be smoothly brought into contact with the slide members 21 and 31 respectively.

A rotating operation of the display screen turning apparatus 1 according to the first embodiment of the present invention is now described with reference to FIGS. 4 and 7 to 10.

Figure 7:
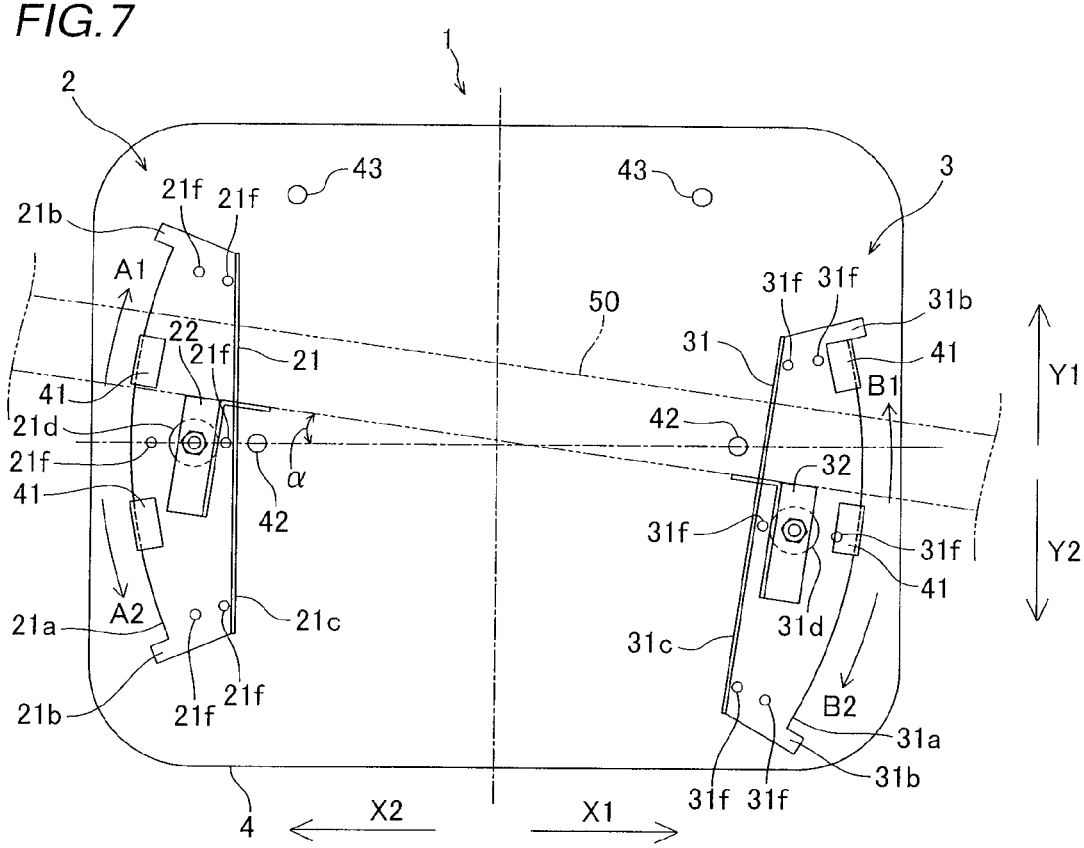
FIGS. 7 to 10 are plan views for illustrating a rotating operation of the display screen turning apparatus according to the first embodiment of the present invention shown in FIG. 1.

When the slide member 31 of the left rotation support portion 3 is rotated along the guide portions 41 along arrow B2 as shown in FIG. 7 from the state where the display screen portion 50 is not rotated as shown in FIG. 4, the support member 22 of the right rotation support portion 2 is horizontally rotated with respect to the slide member 21 following the rotation of the slide member 31. When the slide member 31 is rotated by a prescribed angle, the front projecting portion 31b (along arrow Y1) of the slide member 31 is brought into contact with the corresponding guide portion 41, to control the rotation of the slide member 31. Thus, the display screen portion 50 is rotated clockwise by α° in plan view.

Figure 8:
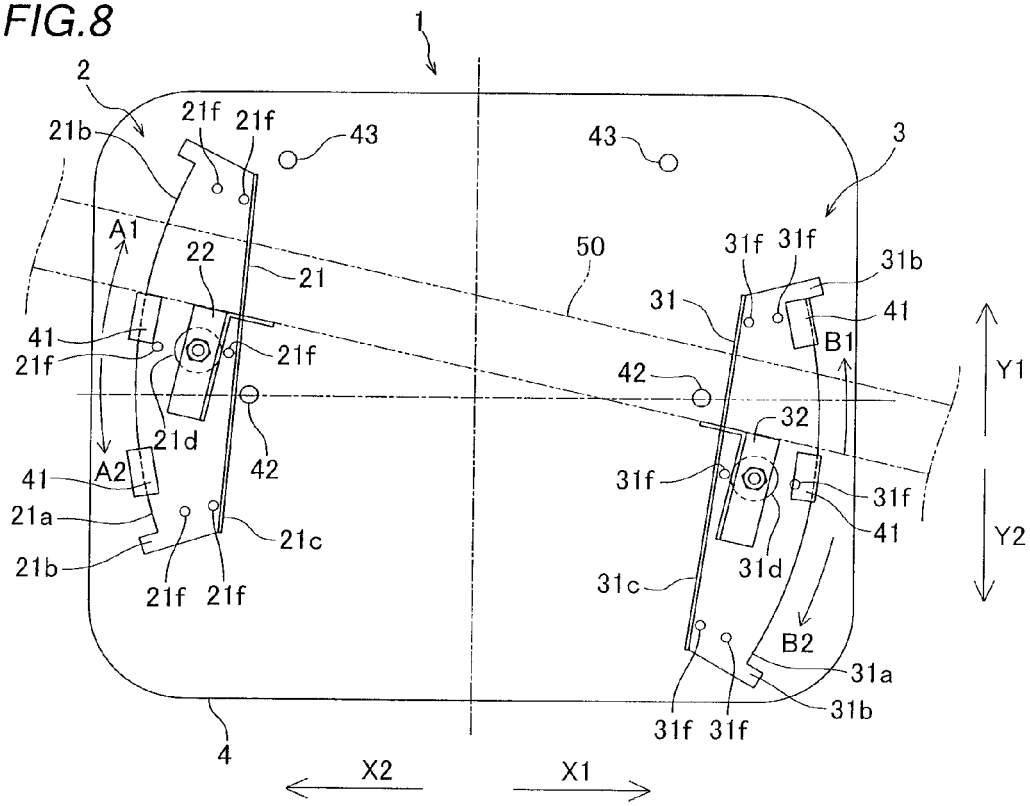
Figure 9:
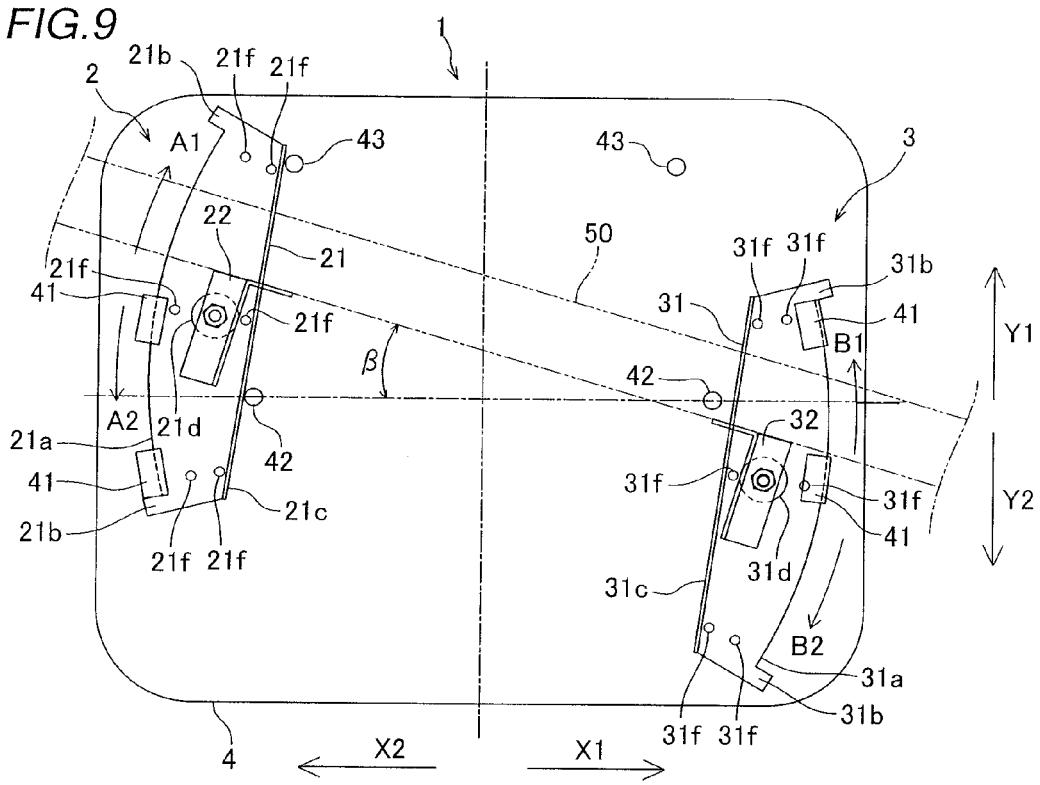

When the slide member 21 of the right rotation support portion 2 is thereafter rotated along arrow A1 as shown in FIG. 8, the support member 32 of the left rotation support portion 3 is horizontally rotated with respect to the slide member 31 following the rotation of the slide member 21. When the slide member 21 is further rotated as shown in FIG. 9, the rear projecting portion 21b (along arrow Y2) of the slide member 21 is brought into contact with the corresponding guide portion 41, to control the rotation of the slide member 21. Thus, the display screen portion 50 is rotated clockwise by β° in plan view. At this time, the linear side portion 21c of the slide member 21 is brought into contact with the first and second disengagement preventing portions 42 and 43, thereby inhibiting the slide member 21 from deviating inward beyond the first and second disengagement preventing portions 42 and 43 (along arrow X1).

Figure 10:
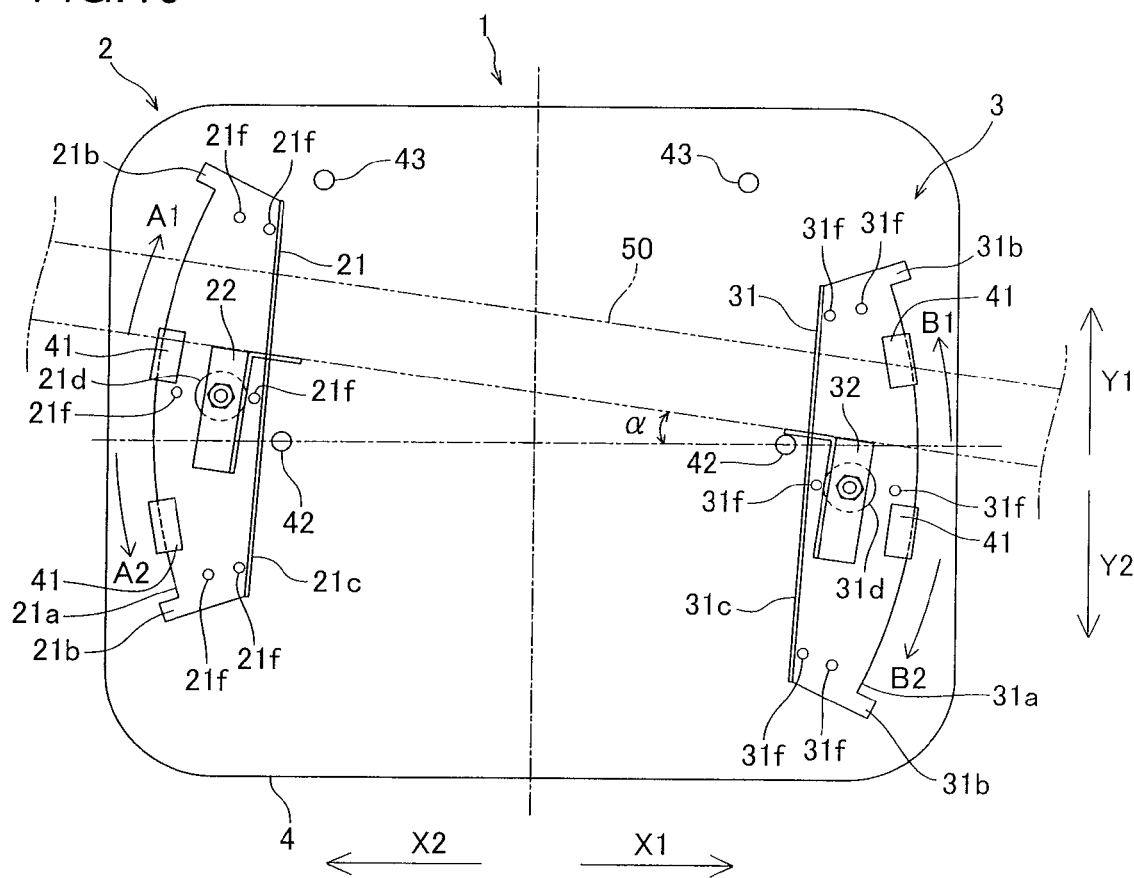

Also when both of the slide members 21 and 31 of the right and left rotation support portions 2 and 3 are rotated as shown in FIG. 10, the display screen portion 50 can be rotated clockwise by α° in plan view, similarly to the case of rotating only the slide member 31 of the left rotation support portion 3 as shown in FIG. 7. In the states shown in FIGS. 7 and 10, the positions of the display screen portion 50 in the anteroposterior direction (along arrows Y1 and Y2) are different from each other, while the rotation angle thereof remains at α°. More specifically, the display screen portion 50 shown in FIG. 10 is arranged on a position frontward beyond that shown in FIG. 7. In other words, the display screen turning apparatus 1 according to the first embodiment can horizontally rotate the display screen portion 50 along a plurality of different rotational tracks, and has a higher degree of freedom in arrangement of the display screen portion 50 as compared with a case of rotating the display screen portion 50 along a single rotational track.

According to the first embodiment, as hereinabove described, the display screen turning apparatus 1 is provided with the right rotation support portion 2 formed to be horizontally rotatable with respect to the base 4 and the left rotation support portion 3 formed to be horizontally rotatable with respect to the base 4 independently of the right rotation support portion 2 and formed to horizontally rotate the display screen portion 50 by rotating at least either the right rotation support portion 2 or the left rotation support portion 3 so that the display screen portion 50 is rotated along different rotational tracks when only the right rotation support portion 2 is rotated, only the left rotation support portion 3 is rotated and both of the right and left rotation support portions 2 and 3 are rotated respectively, whereby the degree of freedom in arrangement (direction and position) of the display screen portion 50 can be improved. Further, the display screen portion 50 is so supported by the right and left rotation support portions 2 and 3 that the same may not be self-supported on the base 4. Therefore, the display screen portion 50 can be stably supported by the right and left rotation support portions 2 and 3 also when the same is thinly formed.

According to the first embodiment, the support member 22 is formed to support the right side of the display screen portion 50 as viewed from the front side and to horizontally rotate with respect to the slide member 21 following movement of the slide member 31 while the support member 32 is formed to support the left side of the display screen portion 50 as viewed from the front side and to horizontally rotate with respect to the slide member 31 following movement of the slide member 21 so that the support member 32 (support member 22) supporting a second side (first side) is also rotated when the slide member 21 (slide member 31) supporting the first side (second side) is rotated, whereby the display screen portion 50 can be smoothly rotated.

According to the first embodiment, the base 4 is provided with the guide portions 41 guiding rotation of the slide members 21 and 31 upon horizontal rotation of the slide members 21 and 31, whereby the display screen portion 50 can be smoothly rotated by rotating the slide members 21 and 31 along the guide portions 41.

According to the first embodiment, the slide member 21 (slide member 31) is provided with the protrusions 21b (31b) coming into contact with the guide portions 41 thereby controlling rotation of the slide member 21 (slide member 31) with respect to the base 4, whereby the display screen portion 50 can be easily prevented from rotation in excess of a prescribed angle with the protrusions 21b (31b).

According to the first embodiment, the guide portions 41 of the base 4 are formed to inhibit the slide members 21 and 31 from floating up from the base 4 respectively, whereby the slide members 21 and 31 can be inhibited from floating up from the base 4 when horizontally rotating the display screen portion 50.

According to the first embodiment, the projecting portions 21f (31f) are provided on the surface of the slide member 21 (slide member 31) coming into contact with the base 4 and the slide member 21 (slide member 31) is formed to horizontally rotate when the projecting portions 21f (31f) slide with respect to the base 4 so that the slide member 21 (slide member 31) rotates while only the projecting portions 21f (31f) are in contact with the base 4, whereby the range of abrasions caused on the members 21 and 31 due to friction in rotation can be restricted.

According to the first embodiment, the protrusions 21b (protrusions 31b) are integrally provided on both ends of the side portion 21a of the slide member 21 (side portion 31a of the slide member 31), whereby the display screen portion 50 can be easily prevented from rotation in excess of the prescribed angle regardless of the rotational direction of the slide member 21 (slide member 31), while increase in the number of components is suppressed due to the protrusions 21b (protrusions 31b) integrally provided on both ends of the side portion 21a (31a).

According to the first embodiment, the guided side portion 21a (31a) of the slide member 21 (slide member 31) is arcuately formed, whereby the display screen portion 50 can be smoothly rotated by rotating the slide member 21 (slide member 31) so that the arcuate side portion 21a (31a) is along the guide portions 41.

According to the first embodiment, the protrusions 21b are formed to protrude in the radial direction of the arc formed by the side portion 21a of the slide member 21 while the protrusions 31b are formed to protrude in the radial direction of the arc formed by the side portion 31a of the slide member 31, whereby the display screen portion 50 can be easily prevented from rotation in excess of the prescribed angle due to the protrusions 21b (protrusions 31b) having the simple shapes protruding in the radial direction of the arc formed by the side portion 21a (31a) of the slide member 21 (slide member 31).

According to the first embodiment, the guide portions 41 are integrally formed on the base 4, whereby increase in the number of components can be suppressed.

According to the first embodiment, the first disengagement preventing portions 42 (second disengagement preventing portions 43) are provided on the base 4 to vertically protrude upward from the upper surface of the base 4 to prevent the slide member 21 from disengagement by coming into contact with the slide member 21 upon rotation of the slide member 21 while preventing the slide member 31 from disengagement by coming into contact with the slide member 31 upon rotation of the slide member 31, whereby the slide members 21 and 31 can be easily prevented from disengaging from the base 4 respectively due to the first disengagement preventing portions 42 (second disengagement preventing portions 43) having the simple structure vertically protruding upward from the upper surface of the base 4.

According to the first embodiment, the first disengagement preventing portions 42 (second disengagement preventing portions 43) are integrally formed on the base 4, whereby increase in the number of components can be suppressed.

Second Embodiment

The structure of a display screen turning apparatus 100 according to a second embodiment of the present invention is now described with reference to FIGS. 11 to 15. According to the second embodiment, a display screen portion 50 can be rotated also in the anteroposterior direction in addition to the horizontal direction, dissimilarly to the aforementioned first embodiment.

The display screen turning apparatus 100 according to the second embodiment of the present invention includes a right rotation support portion 102, a left rotation support portion 103 and a base 4 of sheet metal, as shown in FIGS. 11 to 14. The right rotation support portion 102 is an example of the "first rotation support portion" in the present invention, and the left rotation support portion 103 is an example of the "second rotation support portion" in the present invention.

The right rotation support portion 102 is formed to support the right side (along arrow X2) of the display screen portion 50 as viewed from the front side and to rotate in the horizontal direction (along arrows A1 and A2) with respect to the base 4 independently of the left rotation support portion 103. More specifically, the right rotation support portion 102 includes a slide member 21 of sheet metal and a support member 122, and the slide member 21 is formed to horizontally rotate with respect to the base 4, while the support member 122 is formed to support the right side (along arrow X2) of the display screen portion 50 as viewed from the front side. The support member 122 is an example of the "first support member" in the present invention.

Figure 13:
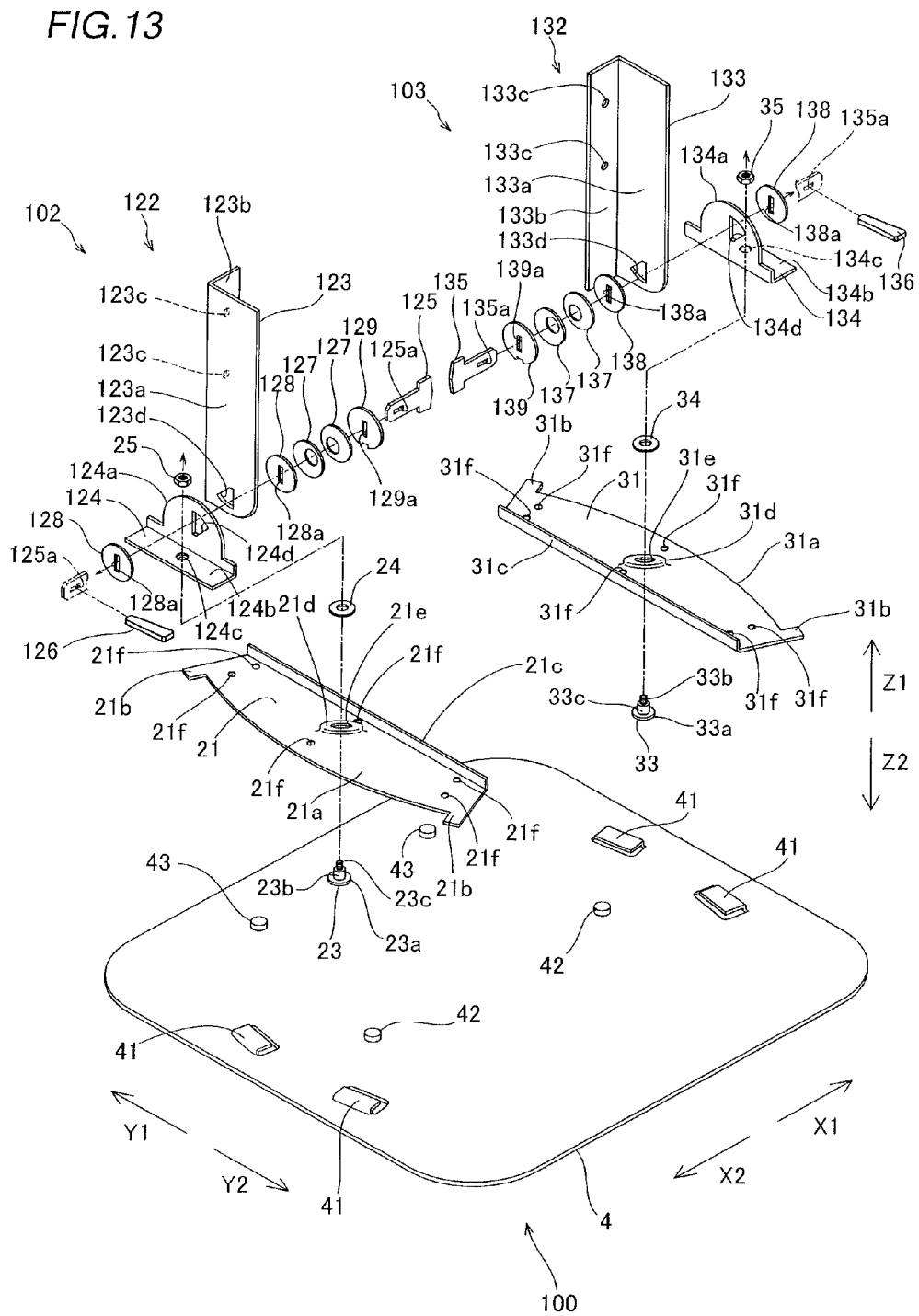
FIG. 13 is an exploded perspective view showing the overall structure of the display screen turning apparatus according to the second embodiment of the present invention shown in FIG. 11.
Figure 14:
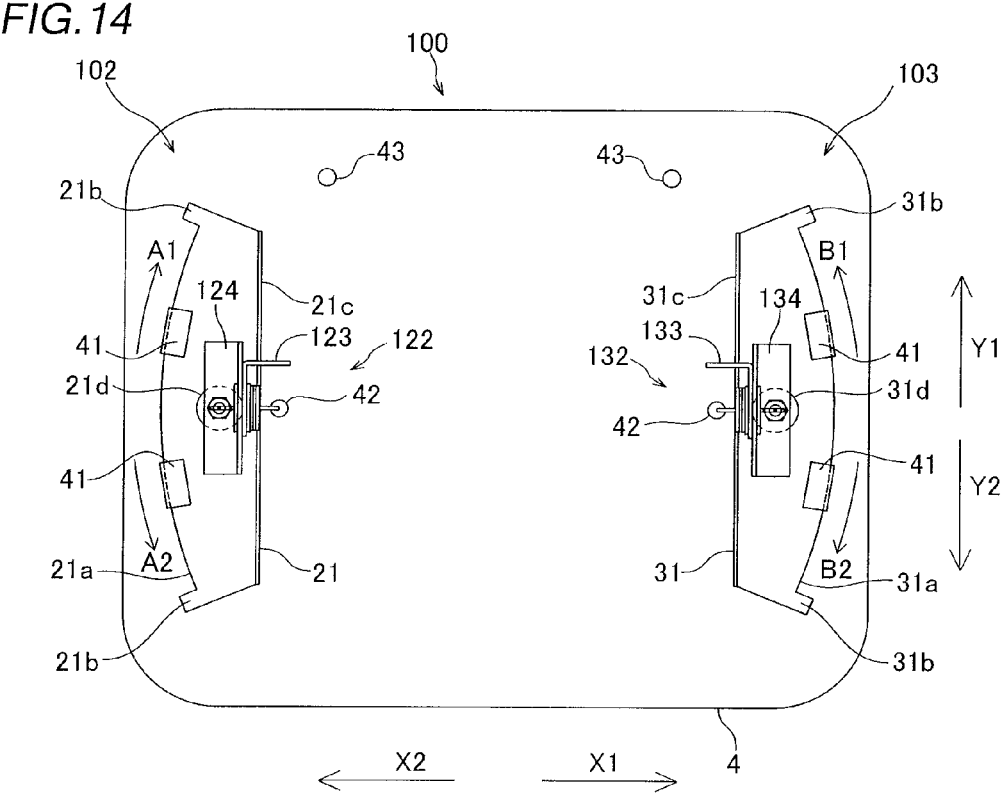
FIG. 14 is a plan view showing the overall structure of the display screen turning apparatus according to the second embodiment of the present invention shown in FIG. 11.

The support member 122 includes a display screen support member 123, a base-side support member 124, a platelike support shaft 125 of sheet metal, a stop member 126 of sheet metal, two disc springs 127 of metal, two pressure plates 128 of sheet metal and a plate member 129 coming into contact with the two disc springs 127 of metal, as shown in FIG. 13.

Figure 11:
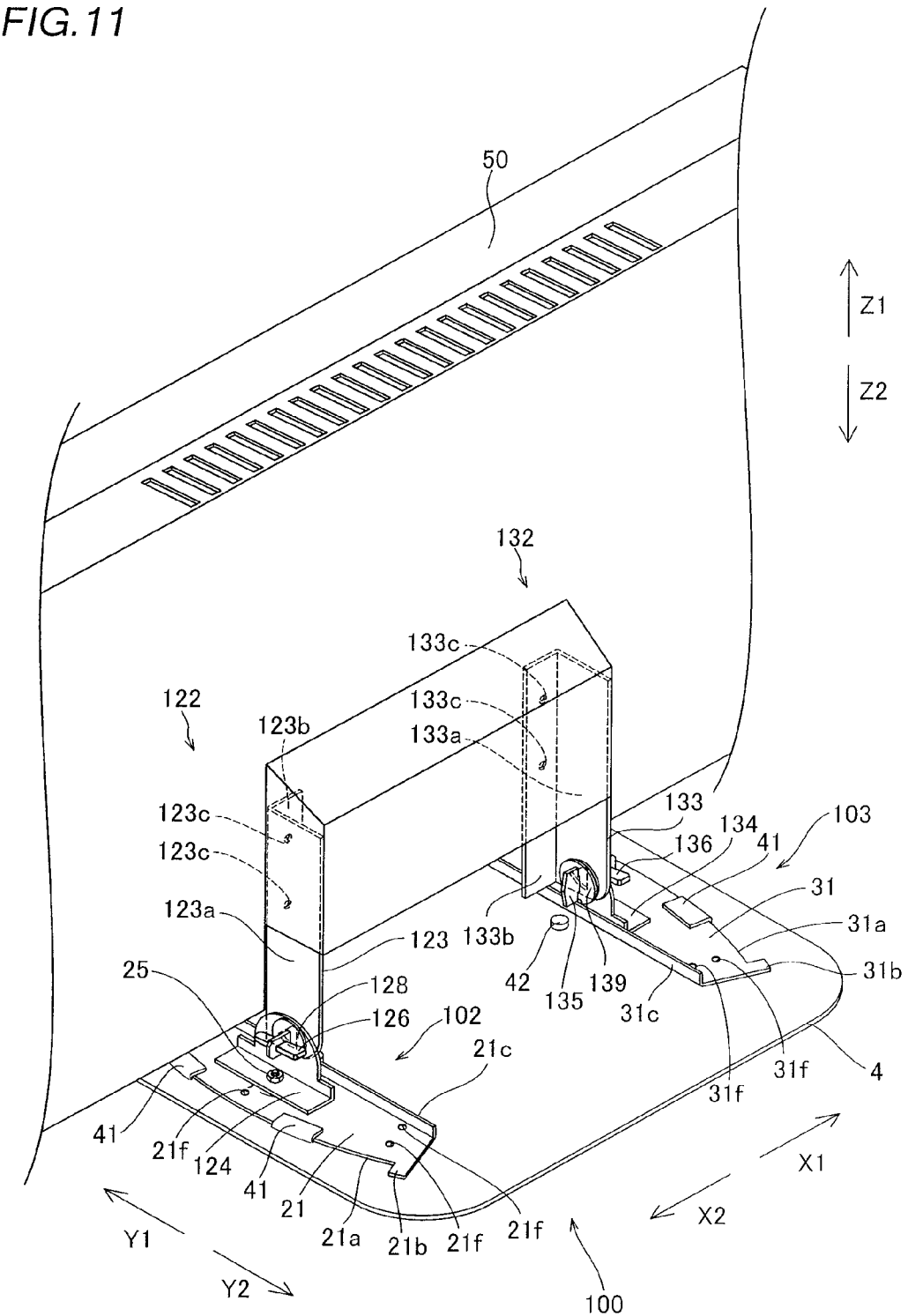
FIG. 11 is a perspective view showing the overall structure of a liquid crystal display provided with a display screen turning apparatus according to a second embodiment of the present invention.
Figure 12:
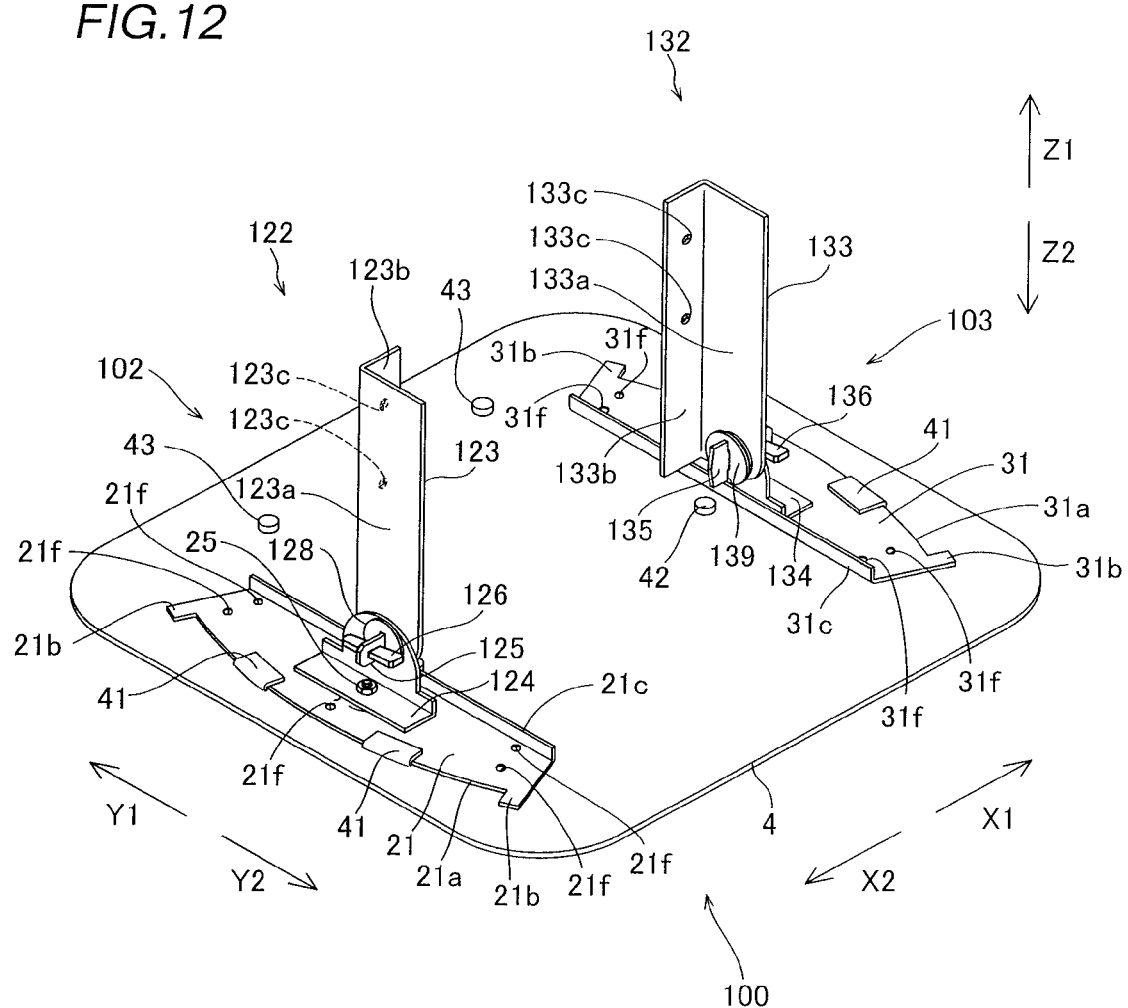
FIG. 12 is a perspective view showing the overall structure of the display screen turning apparatus according to the second embodiment of the present invention shown in FIG. 11.
Figure 15:
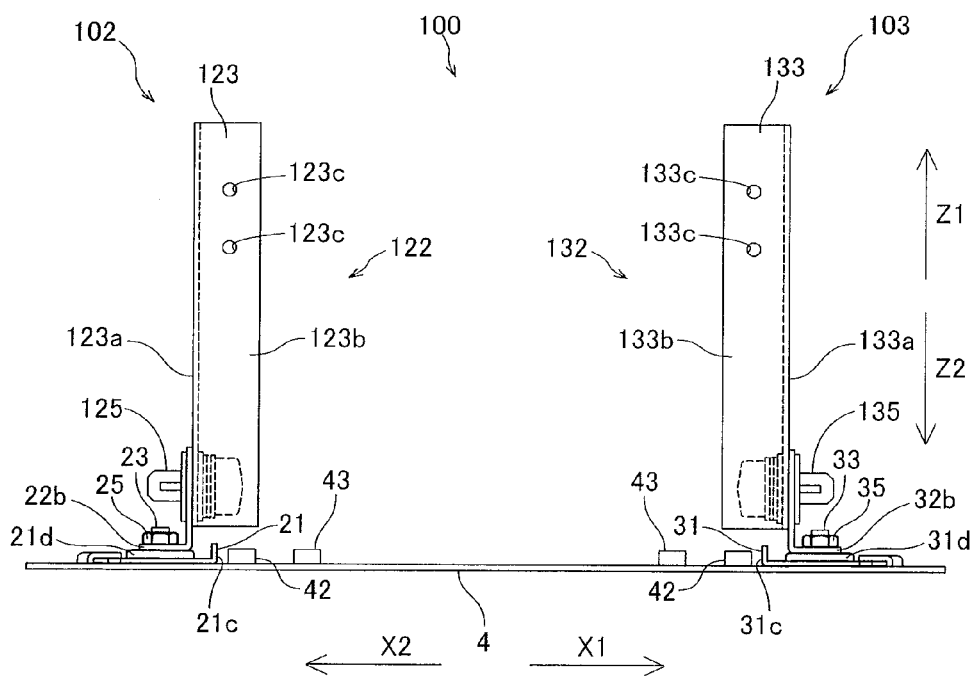
FIG. 15 is a rear elevational view showing the overall structure of the display screen turning apparatus according to the second embodiment of the present invention shown in FIG. 11.

The display screen support member 123 has a platelike upright portion 123a formed to extend in the vertical direction (along arrows Z1 and Z2) as shown in FIGS. 11 to 13, and the platelike upright portion 123 is so arranged that the thickness direction thereof is along the horizontal direction (along arrows X1 and X2) in a state where the display screen portion 50 is not rotated. A platelike mounting portion 123b folded along arrow X1 is integrally formed on the front side (along arrow Y1) of the upright portion 123a. The platelike mounting portion 123b is so arranged that the thickness direction thereof is along the anteroposterior direction (along arrows Y1 and Y2) in the state where the display screen portion 50 is not rotated. The lower end of the mounting portion 123b is arranged on a position higher than a folded side portion 21c of the slide member 21, as shown in FIG. 15. Two threaded holes 123c are formed in the upper portion of the mounting portion 123b at a prescribed distance from each other in the vertical direction. The back surface of the right side (along arrow X2) of the display screen portion 50 as viewed from the front side is mounted on the support member 122 with screws (not shown) inserted into the threaded holes 123c.

A sectorial first hole 123d is formed in the vicinity of the lower end of the upright portion 123a, as shown in FIG. 13. The sectorial first hole 123d is provided for receiving the platelike support shaft 125. The sectorial first hole 123d is so arranged that the base closer to the center of a hole is positioned on the upper side and brought into contact with the upper surface of the support shaft 125. The display screen support member 123 is formed to be rotatable with respect to the platelike support shaft 125 in a sectorial angular range around the base of the sectorial first hole 123d supported by the platelike support shaft 125. In this case, the platelike support shaft 125 of sheet metal functions as the rotating shaft of the display screen support member 123.

The base-side support member 124 has an arcuate portion 124a provided with an arcuately formed upper portion, and the arcuate portion 124a is so arranged that the thickness direction thereof is along the horizontal direction (along arrows X1 and X2). A platelike set portion 124b horizontally folded along arrow X2 is integrally formed on the lower side of the arcuate portion 124a. The platelike set portion 124b is in the form of a horizontal plane, as shown in FIG. 15. Further, the set portion 124b has a circular through-hole 124c formed to receive a body portion 23b of a shaft portion 23, as shown in FIG. 13. The support member 122 is arranged on the slide member 21 through a washer 24, and mounted on the slide member 21 by fitting a nut 25 with a screw portion 23c of the shaft portion 23. Thus, the support member 122 is horizontally rotatable with respect to the slide member 21. Further, the support member 122 is formed to horizontally rotate with respect to the slide member 21 following rotation of a slide member 31 of the left rotation support portion 103.

A sectorial second hole 124d is provided in the arcuate portion 124a of the base-side support member 124, as shown in FIG. 13. The sectorial second hole 124d is provided for receiving the platelike support shaft 125. The sectorial second hole 124d is so arranged that the base closer to the center of a hole is positioned on the upper side and brought into contact with the lower surface of the support shaft 125. The support shaft 125 is formed to be rotatable with respect to the base-side support member 124 in a sectorial angular range around the base of the sectorial second hole 124d of the base-side support member 124.

The platelike support shaft 125 of sheet metal is formed substantially in a T-shaped manner, as shown in FIG. 13. A rectangular hole 125a is formed in the vicinity of an end of the support shaft 125 along arrow X2, for receiving the stop member 126.

The stop member 126 of sheet metal is in the form of a wedge. When inserted into the rectangular hole 125a provided in the platelike support shaft 125, therefore, the stop member 126 can be easily inhibited from coming off the hole 125a.

The two disc springs 127 of metal are arranged on the inner side of one of the pressure plates 128 arranged inside the display screen support member 123 in a state overlapped to be convexed toward each other. The two pressure plates 128 are provided with rectangular holes 128a for receiving the support shaft 125 respectively. The two pressure plates 128 are arranged on the inner side of the display screen support member 123 and on the outer side of the base-side support member 124 respectively. The plate member 129 is provided with a rectangular hole 129a for receiving the support shaft 125. Further, the plate member 129 is arranged on the inner side of the disc springs 127.

According to the second embodiment, the support member 122 can be anteroposteriorly rotated around the platelike support shaft 125 of sheet metal serving as the rotating shaft due to the aforementioned structure, whereby the display screen portion 50 can also be anteroposteriorly rotated as a result. The display screen support member 123 and the base-side support member 124 are pressed against each other due to urging force of the two disc springs 127, whereby frictional force of a prescribed magnitude acts therebetween. When the display screen portion 50 is anteroposteriorly inclined, the inclined state can be maintained due to the frictional force.

The left rotation support portion 103 is formed to support the left side (along arrow X1) of the display screen portion 50 as viewed from the front side, and to horizontally rotate (along arrows B1 and B2) with respect to the base 4 independently of the right rotation support portion 102. More specifically, the left rotation support portion 103 includes the slide member 31 of sheet metal and a support member 132, and the slide member 31 is formed to horizontally rotate with respect to the base 4, while the support member 132 is formed to support the left side (along arrow X1) of the display screen portion 50 as viewed from the front side. The support member 132 is an example of the "second support member" in the present invention.

The support member 132 of the left rotation support portion 103 is similar in structure to the support member 122 of the right rotation support member 102, and bilaterally symmetrical to the support member 122 of the right rotation support member 102. Therefore, redundant description of the support member 132 of the left rotation support portion 103 is omitted. A display screen support member 133, a base-side support member 134, a platelike support shaft 135 of sheet metal, a stop member 136 of sheet metal 136, two disc springs 137 of metal, two pressure plates 138 of sheet metal and a plate member 139 of the support member 132 of the left rotation support portion 103 correspond to the display screen support member 123, the base-side support member 124, the platelike support shaft 125 of sheet metal, the stop member 126 of sheet metal, the two disc springs 127 of metal, the two pressure plates 128 of sheet metal and the plate member 129 of the support member 122 of the right rotation support portion 102 respectively. Further, an upright portion 133a, a mounting portion 133b, threaded holes 133c and a first hole 133d of the display screen support member 133 of the left rotation support portion 103 correspond to the upright portion 123a, the mounting portion 123b, the threaded holes 123c and the first hole 123d of the display screen support member 123 of the right rotation support portion 102 respectively, while an arcuate portion 134a, a set portion 134b, a through-hole 134c and a second hole 134d of the base-side support member 134 of the left rotation support portion 103 correspond to the arcuate portion 124a, the set portion 124b, the through-hole 124c and the second hole 124d of the base-side support member 124 of the right rotation support portion 102 respectively. In addition, holes 135a, 138a and 139a of the support shaft 135, the pressure plate 138 and the plate member 139 of the left rotation support portion 103 correspond to the holes 125a, 128a and 129a of the support shaft 125, the pressure plate 128 and the plate member 129 of the right rotation support portion 102 respectively.

The remaining structure of the second embodiment is similar to that of the aforementioned first embodiment.

According to the second embodiment, as hereinabove described, the display screen portion 50 is formed to be anteroposteriorly rotatable so that the same can be rotated also in the anteroposterior direction in addition to the horizontal direction, whereby the degree of freedom in arrangement of the display screen portion 50 can be further improved.

The remaining effects of the second embodiment are similar to those of the aforementioned first embodiment.

Although the present invention has been described and illustrated in detail, it is clearly understood that the same is by way of illustration and example only and is not to be taken by way of limitation, the spirit and scope of the present invention being limited only by the terms of the appended claims.

For example, while the first and second support members are formed to be horizontally rotatable with respect to the first and second slide members respectively in each of the aforementioned first and second embodiments, the present invention is not restricted to this, but the first and second support members may alternatively be unrotational with respect to the first and second slide members respectively.

While the projecting portions of each slide member slide with respect to the base in each of the aforementioned first and second embodiments, the present invention is not restricted to this, but the overall surface of the slide member closer to the base may alternatively be rendered slidable, or a sheet of Teflon (registered trademark) or the like for reducing frictional resistance may be provided between the slide member and the base.

Figure 16:
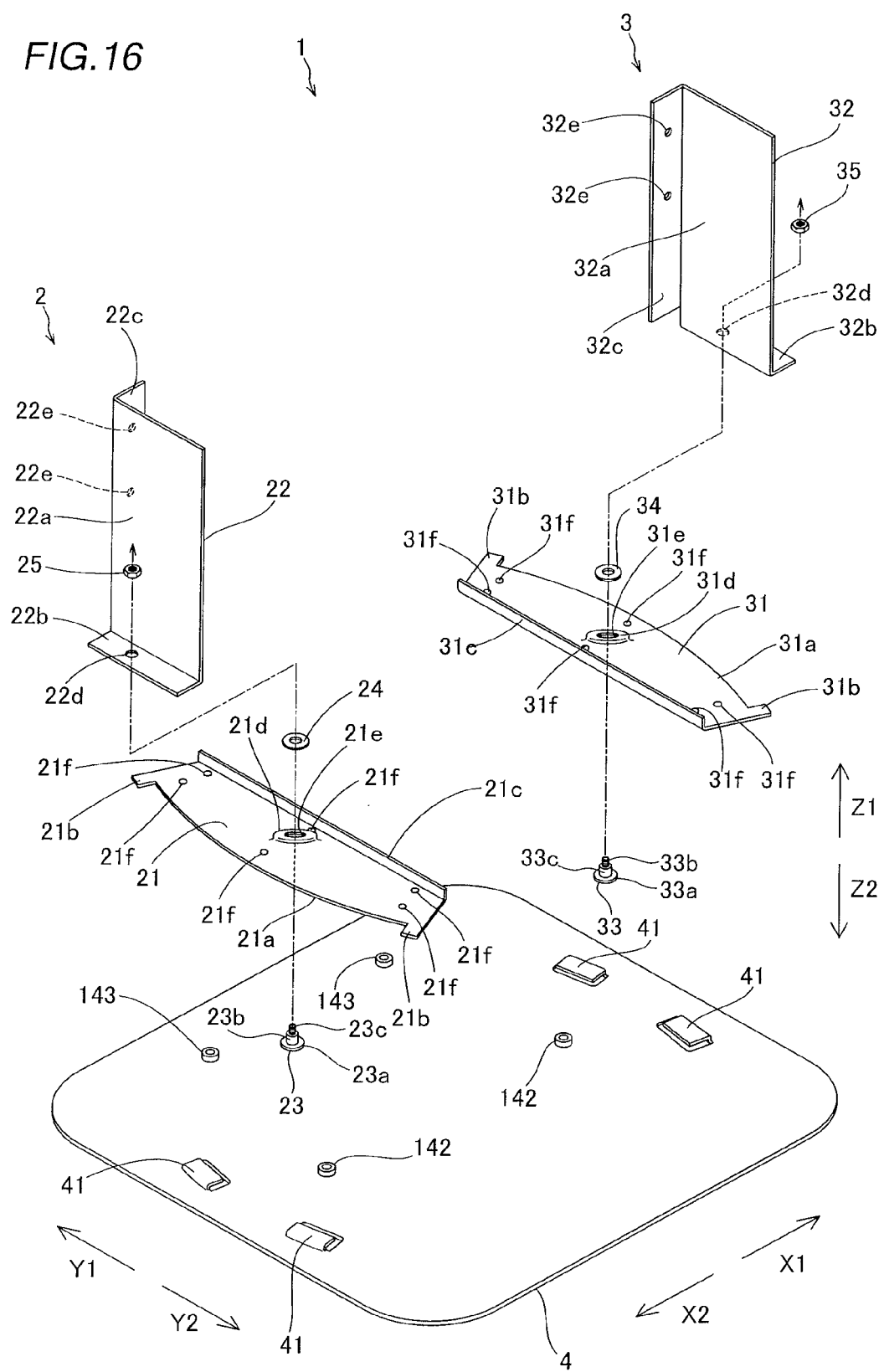
FIG. 16 is a plan view showing a modification of the display screen turning apparatus according to each of the first and second embodiments of the present invention.

While the disengagement preventing portions formed by drawing are shown as the examples of the disengagement preventing portion in each of the aforementioned first and second embodiments, the present invention is not restricted to this, but disengagement preventing portions 142 and 143 formed by burring may alternatively be employed, as shown in FIG. 16.

While the two guide portions are provided on each of the slide members 21 and 31 in each of the aforementioned first and second embodiments, the present invention is not restricted to this, but a single or at least three guide portions may alternatively be provided on each of the slide members 21 and 31. Further alternatively, the numbers of the guide portions provided on the slide members 21 and 31 may be different from each other.

While the protrusions protruding in the radial directions of the arcs formed by the side portions of the slide members are shown as the examples of the first and second rotation control portions respectively in each of the aforementioned first and second embodiments, the present invention is not restricted to this, but the first and second rotation control portions may alternatively be formed to extend upward from both ends of the slide members or convexly formed on the slide members, so far as the same come into contact with the guide portions.

While the slide members having the folded inner side portions are shown as the examples of the slide members in each of the aforementioned first and second embodiments, the present invention is not restricted to this, but both anteroposterior ends (along arrows Y1 and Y2) of the slide members may alternatively be folded, or the slide members may have no folded portions at all.

What is claimed is:
1. A display screen turning apparatus comprising:
  a base;
  a first rotation support portion provided separately from said base for supporting a display screen portion and formed to be horizontally rotatable with respect to said base;
  a second rotation support portion provided separately from said base for supporting said display screen portion and formed to be horizontally rotatable with respect to said base independently of said first rotation support portion, for horizontally rotating said display screen portion by rotating at least either said first rotation support portion or said second rotation support portion;

at least either said first rotation support portion or said second rotation support portion includes a slide member formed to horizontally slide with respect to said base, and a support member, supporting said display screen portion, formed to be horizontally rotatable with respect to said slide member, wherein said base includes a guide portion formed to guide sliding of said slide member and inhibit said slide member from floating up from said base when said slide member horizontally slides, said slide member includes a first slide member, constituting said first rotation support portion, formed to horizontally slide with respect to said base and a second slide member, constituting said second rotation support portion, formed to horizontally slide with respect to said base, said support member includes a first support member, constituting said first rotation support portion along with said first slide member, formed to be horizontally rotatable with respect to said first slide member and a second support member, constituting said second rotation support portion along with said second slide member, formed to be horizontally rotatable with respect to said second slide member, said guide portion is formed to guide rotation of said first slide member and said second slide member when said first slide member and said second slide member horizontally rotate respectively, said first slide member has a first rotation control portion controlling rotation of said first slide member by coming into contact with said guide portion when said first slide member rotates with respect to said base portion, and said second slide member has a second rotation control portion controlling rotation of said second slide member by coming into contact with said guide portion when said second slide member rotates with respect to said base.

2. The display screen turning apparatus according to claim 1, wherein
said first support member is formed to support a first horizontal side of said display screen portion as viewed from the front side and to horizontally rotate with respect to said first slide member following movement of said second slide member, and
said second support member is formed to support a second horizontal side of said display screen portion as viewed from the front side and to horizontally rotate with respect to said second slide member following movement of said first slide member.

3. The display screen turning apparatus according to claim 1, wherein
said first rotation control portion and said second rotation control portion are integrally provided on both ends of side portions of said first slide member and said second slide member guided by said guide portion respectively.

4. The display screen turning apparatus according to claim 1, wherein
said guide portion of said base is formed to inhibit said first slide member and said second slide member from floating up from said base respectively.

5. The display screen turning apparatus according to claim 3, wherein
said guided side portions of said first slide member and said second slide member are arcuately formed respectively.

6. The display screen turning apparatus according to claim 5, wherein
said first rotation control portion is formed to protrude in the radial direction of the arc formed by said side portion of said first slide member, and
said second rotation control portion is formed to protrude in the radial direction of the arc formed by said side portion of said second slide member.

7. The display screen turning apparatus according to claim 1, wherein
said guide portion is integrally formed on said base.

8. The display screen turning apparatus according to claim 1, wherein
said first slide member and said second slide member have projecting portions on surfaces coming into contact with said base respectively, and are formed to horizontally rotate when said projecting portions slide with respect to said base.

9. The display screen turning apparatus according to claim 8, wherein
each of said first slide member and said second slide member has a plurality of said projecting portions, and
said plurality of projecting portions have substantially identical heights respectively.

10. The display screen turning apparatus according to claim 1, wherein
said base includes a disengagement preventing portion preventing disengagement of said first slide member and said second slide member when the display screen turning apparatus is operatively configured and supporting the display screen portion.

11. The display screen turning apparatus according to claim 10, wherein
said disengagement preventing portion is provided on said base to vertically protrude upward from the upper surface of said base and formed to prevent disengagement of said first slide member by coming into contact with said first slide member when said first slide member rotates and to prevent disengagement of said second slide member by coming into contact with said second slide member when said second slide member rotates.

12. The display screen turning apparatus according to claim 11, wherein
said disengagement preventing portion is arranged on the base between facing sides of said first slide member and said second slide member.

13. The display screen turning apparatus according to claim 11, wherein
said disengagement preventing portion comprises a number of discrete portions each having a circular shape in a plan view of the upper surface of said base.

14. The display screen turning apparatus according to claim 10, wherein
said disengagement preventing portion is integrally provided on said base.

15. The display screen turning apparatus according to claim 1, wherein
said first slide member and said second slide member have side portions vertically folded upward respectively.

16. The display screen turning apparatus according to claim 1, wherein
said first support member and said second support member are formed to support said display screen portion to be anteroposteriorly rotatable respectively.

* * * * *